US012617550B2

(12) United States Patent
 Turk

(10) Patent No.: US 12,617,550 B2
(45) Date of Patent: May 5, 2026

(54) GUIDANCE SYSTEM

(71) Applicant: Tusas—Turk Havacilik Ve Uzay Sanayii Anonim Sirketi, Kahramankazan (TR)

(72) Inventor: Fatih Turk, Kahramankazan (TR)

(73) Assignee: Tusas—Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 0 days.

(21) Appl. No.: 18/932,689

(22) Filed: Oct. 31, 2024

(65) Prior Publication Data

US 2025/0206461 A1     Jun. 26, 2025

(30) Foreign Application Priority Data

Dec. 21, 2023    (TR) ................................ 2023/017906

(51) Int. Cl.
 *B64D 45/00*        (2006.01)
 *F02C 7/18*        (2006.01)
(52) U.S. Cl.
 CPC .............. B64D 45/00 (2013.01); F02C 7/185 (2013.01)
(58) Field of Classification Search
 CPC ......... B64D 33/04; B64D 45/00; F01N 13/08; F01N 13/082; F01N 2270/02; F01N 2270/08; F01N 2270/10; F01N 2590/00; F02C 7/185; F02C 7/24; F02K 1/00;
 F02K 1/28; F02K 1/30; F02K 1/32; F02K 1/34; F02K 1/78; F02K 1/822; F02K 1/825; F02K 9/30; F02K 9/82
 USPC .......................................... 244/129.1; 60/309
 See application file for complete search history.

(56) References Cited

U.S. PATENT DOCUMENTS

| | | | | |
|---|---|---|---|---|
| 4,004,416 | A | * | 1/1977 | Amelio ................... F02K 1/825 239/265.17 |
| 4,876,851 | A | * | 10/1989 | Mueller ................. F02K 1/825 60/264 |
| 11,905,962 | B2 | * | 2/2024 | Castillo ................. F04D 27/004 |
| 2006/0230744 | A1 | * | 10/2006 | Beutin .................... F02K 1/006 60/231 |
| 2008/0264034 | A1 | | 10/2008 | Iya et al. |
| 2020/0025072 | A1 | * | 1/2020 | Mackin .................. B64C 23/06 |
| 2023/0107062 | A1 | * | 4/2023 | Family ................. B64D 27/357 244/53 R |
| 2023/0265857 | A1 | * | 8/2023 | Castillo ................. F04D 27/008 417/53 |

FOREIGN PATENT DOCUMENTS

| | | | | |
|---|---|---|---|---|
| CN | 217440154 | | 9/2022 | |
| EP | 1712769 | A1 * | 10/2006 | ............. F02K 1/006 |
| EP | 1750003 | A2 * | 2/2007 | ............. F02K 1/386 |
| FR | 2508098 | | 12/1982 | |

* cited by examiner

*Primary Examiner* — Joshua E Rodden

(57) ABSTRACT

The present invention relates to a body (2) that is an aircraft, at least one engine (3) that is located on the body (2) and generates the power required for the flight of the aircraft, and at least one exhaust (4) that is located on the engine (3) and transmits the fluid (A) heated inside the engine (3) due to the operation of the engine (3) to the outside of the aircraft.

10 Claims, 3 Drawing Sheets

GUIDANCE SYSTEM

RELATED APPLICATIONS

This application is a Paris Convention, which claims the benefit of priority of Turkish Patent Application No. 2023/017906 filed on Dec. 21, 2023. The contents of the above application is all incorporated by reference as if fully set forth herein in its entirety.

FIELD AND BACKGROUND OF THE INVENTION

The present invention relates to a guidance system that reduces the thermal signature of the heated fluid discharged from the aircraft.

In wartime, various types of missiles are used to hit aircraft and infrared (IR) cameras are used to detect aircraft. Heat-seeking missiles are one of these missile types. There are various versions of heat-seeking missiles. While some follow the exhaust heat, others act according to the distribution of heat coming out of the exhaust by knowing the IR signature of the aircraft, so they can follow more precisely using software algorithms. It is more difficult to obfuscate the missiles that can follow IR. In addition, IR cameras can also detect the type of helicopter according to the IR signature. The heated fluid coming out of the exhaust has the same characteristic heat distribution. Therefore, the aircraft is detected by following the IR signature.

In the patent document numbered FR2508098 in the state of the art, a system that allows external air to be drawn under the wheel or track housing of a drive unit to protect a vehicle from infrared detection and directs the drawn air towards the radiator and engine for cooling and combustion is disclosed. In the subject of the invention mentioned in the relevant document, a portion of the air in the system is accelerated by a fan and the flow cross-section is reduced by a circular nozzle.

In the utility model document numbered CN217440154U in the state of the art, an anti-infrared hidden shelter system that comprises a shelter body, a generator set, and a heat distribution air outlet is disclosed. In the subject of the invention mentioned in the relevant document, the air outlet in the system is positioned in the shelter body. An electronic temperature fan is attached to the heat distribution air outlet and the electronic constant temperature fan is connected to the generator set.

In the United States patent document numbered US20080264034A1 in the state of the art, a system and method for cooling at least a portion of an engine is disclosed. The engine is cooled using a fuel such as a high heat absorbing fuel used for combustion in the engine later. The fuel is used to cool the gases and/or components in the engine, thus cooling the engine, including the exhaust nozzle.

SUMMARY OF THE INVENTION

By means of a guidance system developed with the present invention, the thermal signature of the aircraft is reduced and the heat-tracking missiles and/or infrared (IR) cameras are deceived and prevented from detecting the aircraft.

Another aim of this invention is to ensure that the heated fluid discharged from the aircraft is distributed in different directions and/or irregularly.

A guidance system, which is realised to achieve the aim of the invention and defined in the first claim and the claims dependent on this claim, comprises a body that is located on a fixed wing or rotary wing aircraft, which is an airplane, unmanned aerial vehicle or helicopter. The body comprises at least one engine on the body that provides the necessary thrust for aircraft flight. It comprises at least one exhaust that is located on the engine in a way that it will be connected to the engine and allows the heated fluid (A) formed due to the operation of the engine and that needs to be released to the outside to be discharged.

A guidance system, which is the subject of the invention, comprises at least one guide that is located on the fuselage and/or on the exhaust in a way that intervenes in the heated fluid (A) coming out of the exhaust and faces the exhaust outlet, opposing the air formed and flowing around the aircraft during the flight of the aircraft, extending outward from the fuselage and taking in the formed air flow, directing the taken air flow (H) to the exhaust outlet and thus ensuring that the fluid (A) coming out of the exhaust by heating is distributed irregularly and/or its direction is changed. The guide can be placed on all systems that transmit the heated fluid (A) on the aircraft to the outside of the aircraft and can cool and/or guide the exiting fluid (A).

In one embodiment of the invention, a guidance system comprises at least one fan that acts as a propeller that allows the outside air flow (H) to be taken into the guide and rotates and transmits the received air flow (H) towards the exhaust outlet in the guide.

In one embodiment of the invention, a guidance system comprises at least one opening that is located on the guide so that it will be opposite to the air flow (H) and allows the air flow (H) formed around the aircraft to enter the guide.

In one embodiment of the invention, a guidance system comprises at least one cover that is located on the guide and/or in the guide in a way that will be the direction of the air flow coming out of the guide and that allows the flow rate of the air coming out of the guide to be adjusted by the pilot or autonomously. The cover acts like a movable apparatus on the air conditioner that allows the air to go in different directions.

In one embodiment of the invention, a guidance system comprises at least one control unit that enables the control of the movements of the cover and the transmission of the necessary commands for the intake of air generated during aircraft flight into the guide.

In one embodiment of the invention, a guidance system comprises a cover having an open position (I) in which it allows the air flow (H) coming from the guide to exit without encountering an obstacle, and a second closed position (II) in which the air flow (H) is almost completely reduced by reducing the cross-sectional area of the guide's air outlet area.

In one embodiment of the invention, a guidance system comprises a control unit that adjusts the guides located on the body and/or on the exhaust to provide different flow rates and/or moves the covers to be in open position (I) and/or closed position (II) and allows them to move independently of each other, thus dispersing the hot air coming out of the exhaust.

In one embodiment of the invention, a guidance system comprises a guide that allows the air, which is almost colder than the fluid coming out of the exhaust during flight, to be absorbed and transmitted to the exhaust outlet. The fluid (A), which is the air formed in the combustion events taking place in the engine during the flight of the aircraft, is hotter than the air in the atmosphere in the exhaust.

In one embodiment of the invention, a guidance system comprises a cover that is placed in a form-fitting manner inside the guide and preferably has a cylindrical form. The cover is removably attached to the guide and/or is located in a square cross-sectional area inside the guide.

In one embodiment of the invention, a guidance system comprises a guide that is placed by the manufacturer on the exhaust and/or body and is capable of providing a different air flow (H) that creates a ripple and/or a whirlwind-like vortex on the heated air discharged from the exhaust.

In one embodiment of the invention, a guidance system comprises a guide that is located on the exhaust and provides multiple exhaust exits and transmits the heated fluid (A) inside the engine to the outside of the aircraft in multiple exhaust exits.

BRIEF DESCRIPTION OF SEVERAL VIEWS OF THE DRAWINGS

The guidance system realised to achieve the aim of this invention is shown in the attached figures, and of these figures.

DESCRIPTION OF SPECIFIC EMBODIMENTS OF THE INVENTION

Figure 1:
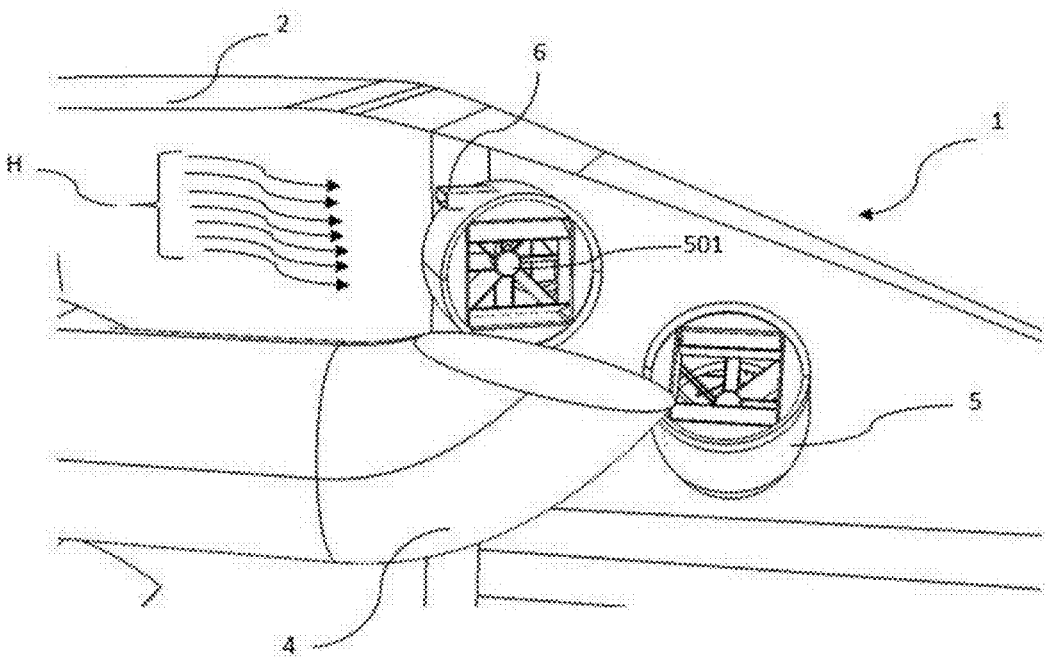
FIG. 1 shows the side view of a guidance system.
Figure 2:
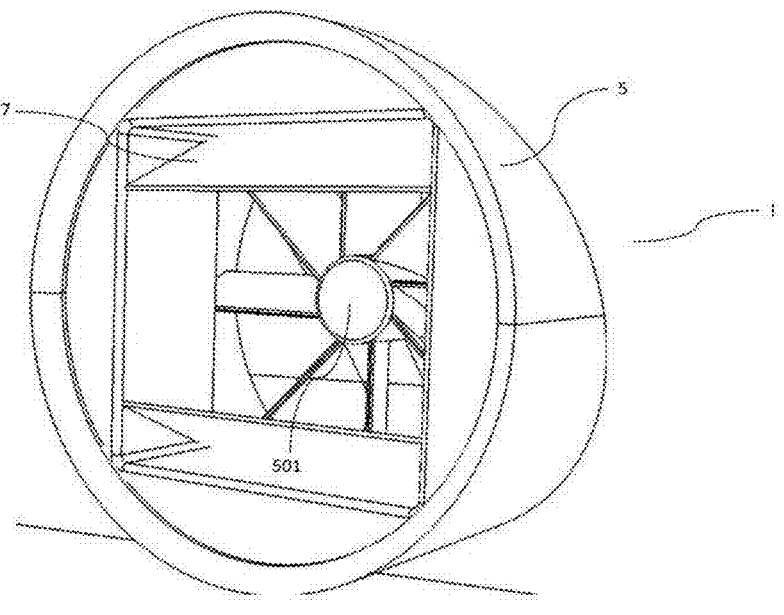
FIG. 2 shows the perspective view of the guide in the open position.
Figure 3:
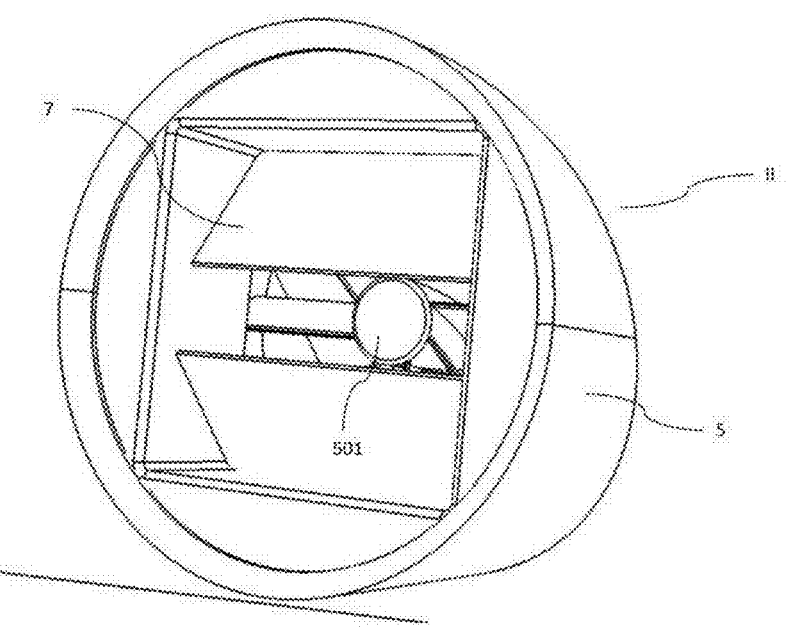
FIG. 3 shows the perspective view of the guide in the closed position.
Figure 4:
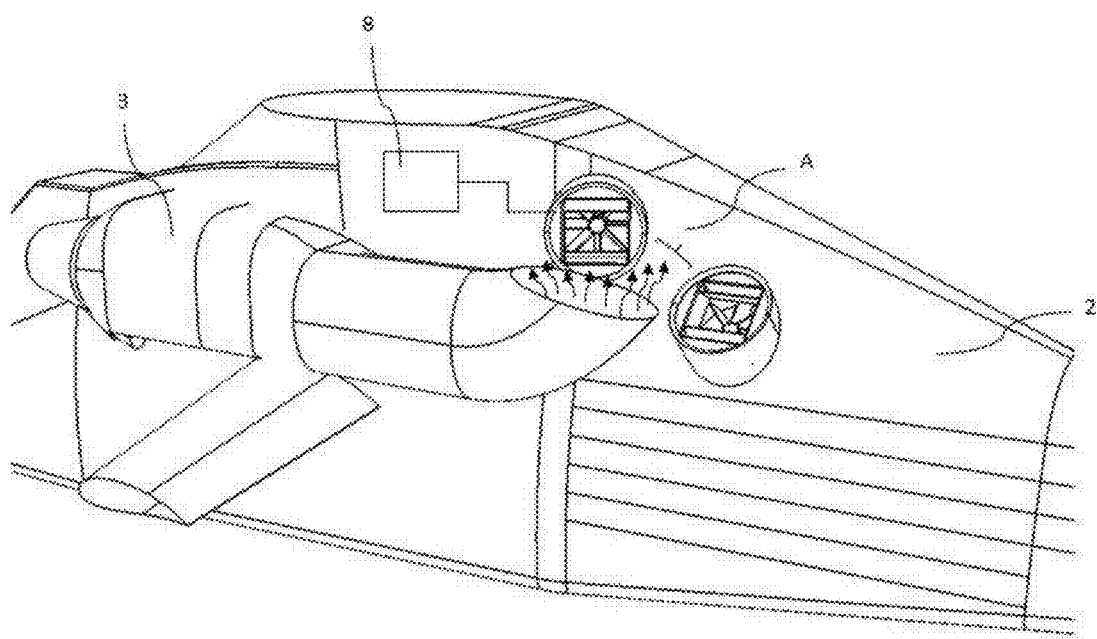
FIG. 4 shows the perspective view of a guidance system.
Figure 5:
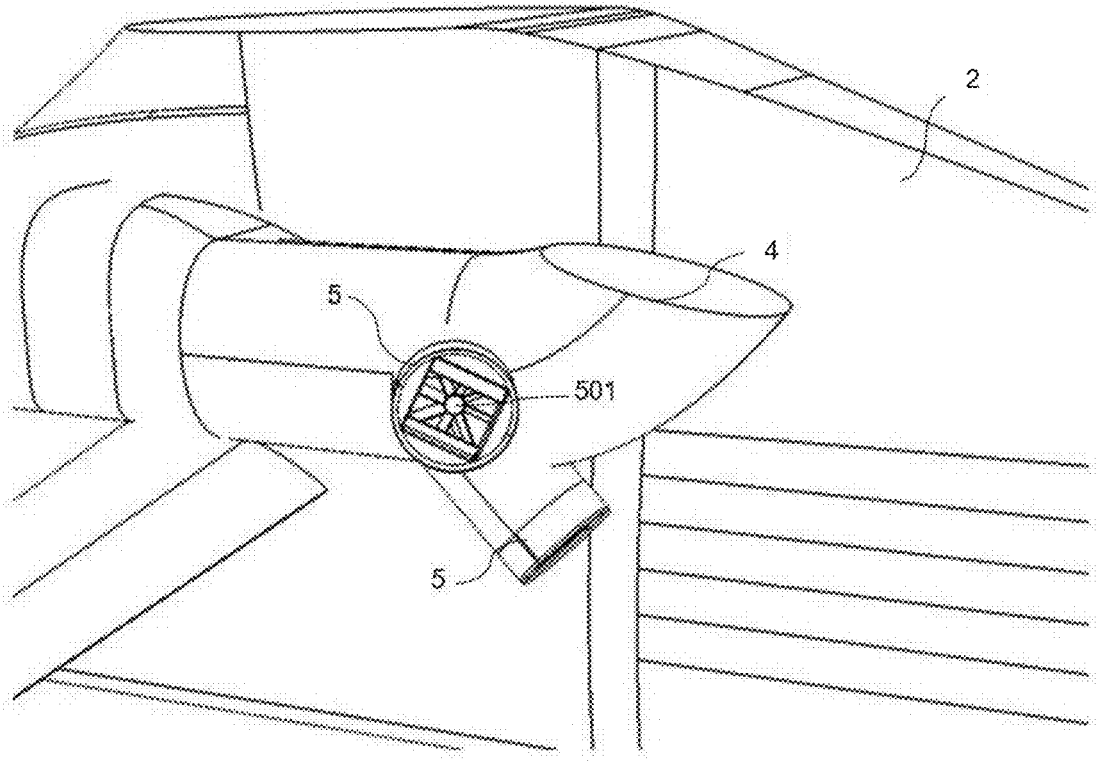
FIG. 5 shows the perspective view of a guidance system, body, exhaust and fan.

The parts in the figures are numbered one by one and the equivalents of these numbers are given below.

1. A guidance system
2. Body
3. Engine
4. Exhaust
5. Guide
    501. Fan
6. Opening
7. Cover
8. Control unit
(A) Fluid
(H) Air flow
(I) First Position
(II) Second Position The guidance system comprises a body (2) that is an aircraft, at least one engine (3) that is located on the body (2) and generates the power required for the flight of the aircraft, and at least one exhaust (4) that is located on the engine (3) and transmits the fluid (A) heated inside the engine (3) due to the operation of the engine (3) to the outside of the aircraft.

The guidance system which is the subject of the invention comprises at least a guide (5) that is located on the body and/or on the exhaust (4) in a way that it faces towards the exhaust (4) outlet, meets the air flow (H) formed during the flight of the aircraft and takes in the formed air flow (H), directs the taken air flow (H) to the exhaust outlet and thus ensures that the fluid (A) heated and coming out of the exhaust (4) is dispersed irregularly and/or its direction is changed.

There is an engine (3) that is positioned on a body (2) which is an aircraft and produces the power required for the aircraft's taxiing and/or flight. Due to the operating principle of the engine (3), it throws out the waste of the processed fuel as fluid (A). There is an exhaust (4) in a form predetermined by the manufacturer, allowing the heated fluid (A) to meet the atmosphere.

The heated fluid that is discharged through the exhaust (4) causes the formation of a hot air mass in the aircraft's exhaust (4) and its surroundings. There is a guide (5) facing the exhaust (4) outlet and/or positioned facing the heated fluid (A) region formed in the exhaust (4) and its surroundings. The guide (5) meets the air flow (H) formed during the aircraft's flight and takes the formed air flow (H) into itself and transmits it towards the exhaust (4) outlet, thus ensuring that the fluid (A) heated up from the exhaust (4) is distributed irregularly and/or its direction is changed.

In one embodiment of the invention, a guidance system (1) comprises at least one fan (501) that is located inside the guide (5) and takes the air flow (H) formed on the guide (5) during the flight of the aircraft into the guide (5) by rotating and transmitting it to the exhaust (4) outlet. By means of the fan (501), the air (H) formed in the external environment is drawn into the guide (5) like a vacuum with an aerodynamic effect and transmitted from the guide (5) to the exhaust (4) outlet.

In one embodiment of the invention, the guidance system (1) comprises at least one opening (6) that is located on the guide (5) and allows the air flow (H) formed during the flight of the aircraft to enter the guide and thus allows air to be absorbed from the external environment. During the flight of the aircraft, there is an air flow (H) due to the aerodynamic effect formed on the body (2) and/or the guide (5). The opening (6) is located in a position that will allow the air flow (H) to enter the guide (5) from the opening (6) in a way that meets the air flow (H). (FIG. 1)

In one embodiment of the invention, the guidance system (1) comprises at least one cover (7) that is movable on the guide (5) and is triggered by the pilot or autonomously, allowing the flow rate of the air (H) coming out of the guide (5) to be adjusted. By means of the cover (7), air flow (H) comes out of the mouth of the guide (5) facing the exhaust (4) outlet at different rates.

In one embodiment of the invention, the guidance system (1) comprises at least one control unit (8) that enables the movements of the cover (7) to be controlled and the commands to be transmitted to the guide (5) for the air flow (H) formed during the flight of the aircraft. The control unit (8) ensures that the air flow (H) is taken into the guide (5) or the air flow (H) is exited from the guide (5) by means of the commands predetermined by the pilot and/or the user.

In one embodiment of the invention, the guidance system (1) comprises a cover (7) that has an open position (I) that allows the air flow (H) coming from the guide (5) to exit, and a second closed position (II) in which the air flow (H) created by the guide (5) is almost completely reduced. The amount of air flow exiting the guide is adjusted by means of the cover (7).

The cover (7) is brought to the open position (I) and closed position (II) by means of the control unit (8) commands, and the air flow (H) exiting the guide (5) is managed.

In one embodiment of the invention, the guidance system (1) comprises a control unit (8) that adjusts the guides (5) positioned on the body (2) and/or on the exhaust (4) to provide different flow rates and/or moves the covers (7) to be in the open position (I) and/or closed position (II) and thus ensures the distribution of hot air coming out of the exhaust (4).

By means of the control unit (8), commands are given to move the cover (7) between the open position (I) and closed positions (II) and air flow is provided at different flow rates of the guides (5).

In one embodiment of the invention, the guidance system (1) comprises a guide (5) that allows the air (H), which is almost colder than the fluid coming out of the exhaust (4) during the flight of the aircraft, to be absorbed and transmitted to the exhaust (4) outlet. Since the air flow (H) formed on the body (2) is colder than the fluid (A) coming out of the exhaust (4), the thermal trace is reduced by directing it to the heated fluid (A) coming out of the exhaust (4) via the guide (5).

In one embodiment of the invention, the guidance system (1) comprises a cover (7) that is removable and compatible with the section form of the guide (5) and is located in a way that creates a square cross-sectional area inside the guide (5). In this way, more than one movable cover (7) is placed inside the guide (5), which has a cylindrical form.

In one embodiment of the invention, the guidance system (1) comprises a guide (5) that is located on the body (2) and/or on the exhaust (4) and creates a different air flow (H) and creates a vortex effect on the fluid (A) discharged from the exhaust (4).

In one embodiment of the invention, the guidance system (1) comprises a guide (5) that is located on the exhaust (4) and ensures that the heated fluid (A) inside the engine (3) exits the aircraft through multiple exhaust (4) outlets.

The invention claimed is:

1. A guidance system (1) comprising:

a body (2) that is an aircraft, at least one engine (3) that is located on the body (2) that generates power required for flight of the aircraft, and at least one exhaust (4) that is located on the engine (3) that transmits fluid (A) heated inside the engine (3) due to operation of the engine (3) to an outside of the aircraft, wherein at least a guide (5) that is located on the body and/or on the exhaust (4), wherein in a way that the guide faces towards the exhaust (4) outlet, meets air flow (H) formed during the flight of the aircraft and takes in the air flow (H), directs the air flow (H) to an exhaust outlet and thus ensures that the fluid heated and coming out of the exhaust (4) is dispersed irregularly and/or an exhaust direction is changed, wherein at least one fan (501) is located inside the guide (5) that takes the air flow (H) into the guide (5) by rotating and transmitting the air flow to the exhaust outlet, and wherein at least one opening (6) that is located on the guide that allows the air flow (H) to enter the guide and thus allows air to be absorbed from an external environment.

2. The guidance system (1) according to claim 1, characterised by at least one cover (7) that is movable on the guide (5) and is triggered by a pilot or autonomously, allowing a flow rate of the air coming out of the guide (5) to be adjusted.

3. The guidance system (1) according to claim 2, characterised by at least one control unit (8) that enables movements of the at least one cover (7) to be controlled and commands to be transmitted to the guide (5) for the air flow (H) formed during the flight of the aircraft.

4. The guidance system (1) according to claim 2, characterised by the at least one cover (7) that has an open position (I) that allows the air flow (H) coming from the guide (5) to exit, and a second closed position (II) in which the air flow (H) created by the guide (5) is almost completely reduced.

5. The guidance system (1) according to claim 2, characterised by a control unit (8) that adjusts the guides (5) positioned on the body (2) and/or on the exhaust (4) to provide different flow rates and/or moves the covers (7) to be in an open position (I) and/or closed position (II) and thus ensures distribution of hot air coming out of the exhaust (4).

6. The guidance system (1) according to claim 1, characterised by the guide (5) that allows the air flow (H), which is almost colder than the fluid coming out of the exhaust (4) during the flight of the aircraft, to be absorbed and transmitted to the exhaust (4) outlet.

7. The guidance system (1) according to claim 6, characterised by a cover (7) that is removable and compatible with a section form of the guide (5) and is located in a way that creates a square cross-sectional area inside the guide (5).

8. The guidance system (1) according to claim 1, characterised by the guide (5) that is located on the body (2) and/or on the exhaust (4) and creates a different air flow (H) and creates a vortex effect on the fluid (A) discharged from the exhaust (4).

9. The guidance system (1) according to claim 1, characterised by the guide (5) that is located on the exhaust (4) and ensures that the heated fluid (A) inside the engine (3) exits the aircraft through multiple exhaust (4) outlets.

10. The guidance system (1) according to claim 1, wherein the guide (5) meets the air flow (H) generated during the flight of the aircraft and provides uneven distribution and/or directional change of the heated fluid (A) coming out of the exhaust (4) by taking the generated air flow (H) into the guide and transmitting it towards the exhaust (4) is dispersed irregularly and/or a heated fluid direction is changed.

* * * * *